No. 850,069. PATENTED APR. 9, 1907.
B. SOLIS.
AGITATOR.
APPLICATION FILED OCT. 30, 1906.
2 SHEETS—SHEET 1.
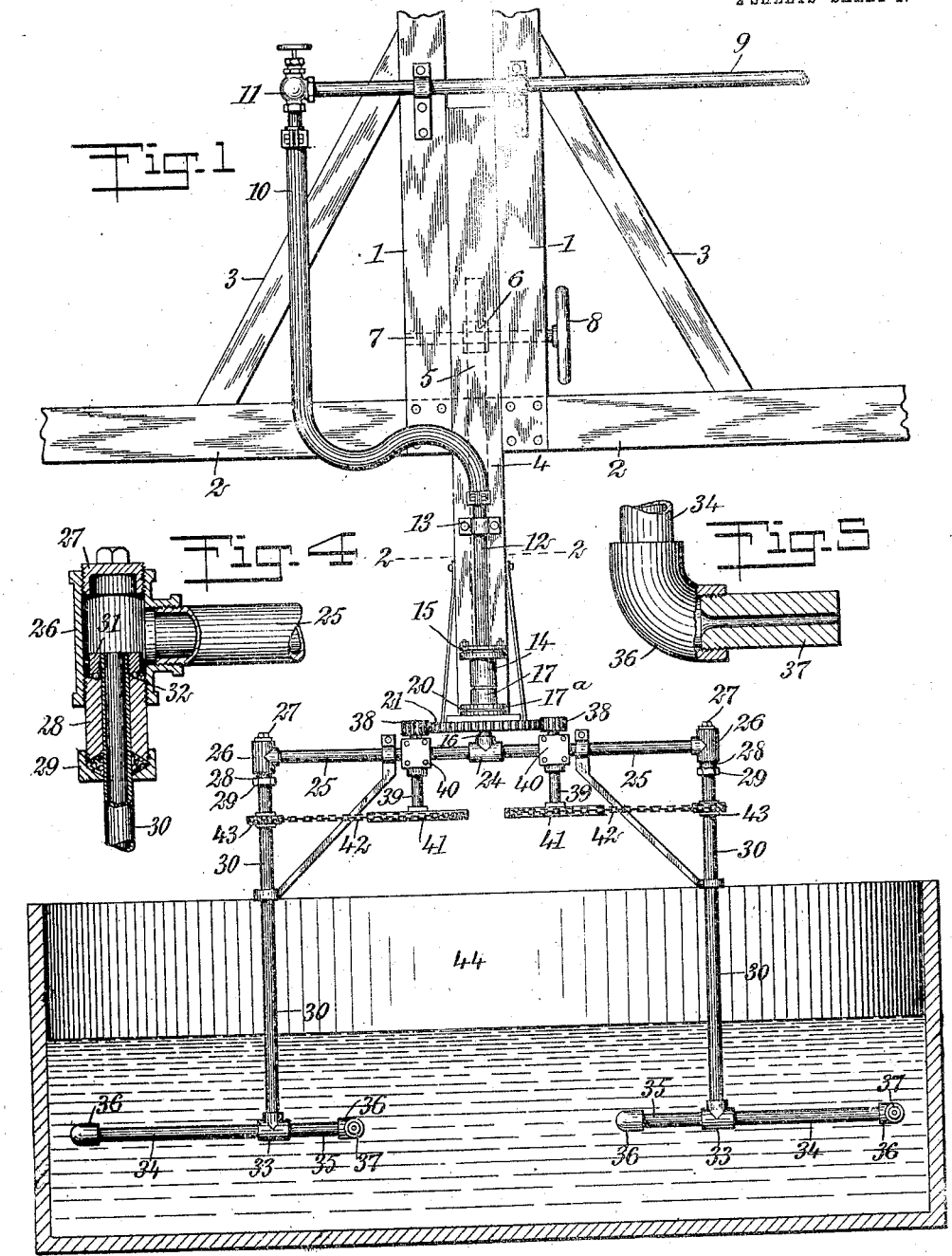
WITNESSES
INVENTOR
Benito Solis
BY
ATTORNEYS No. 850,069. PATENTED APR. 9, 1907.
B. SOLIS.
AGITATOR.
APPLICATION FILED OCT. 30, 1906.
2 SHEETS—SHEET 2.
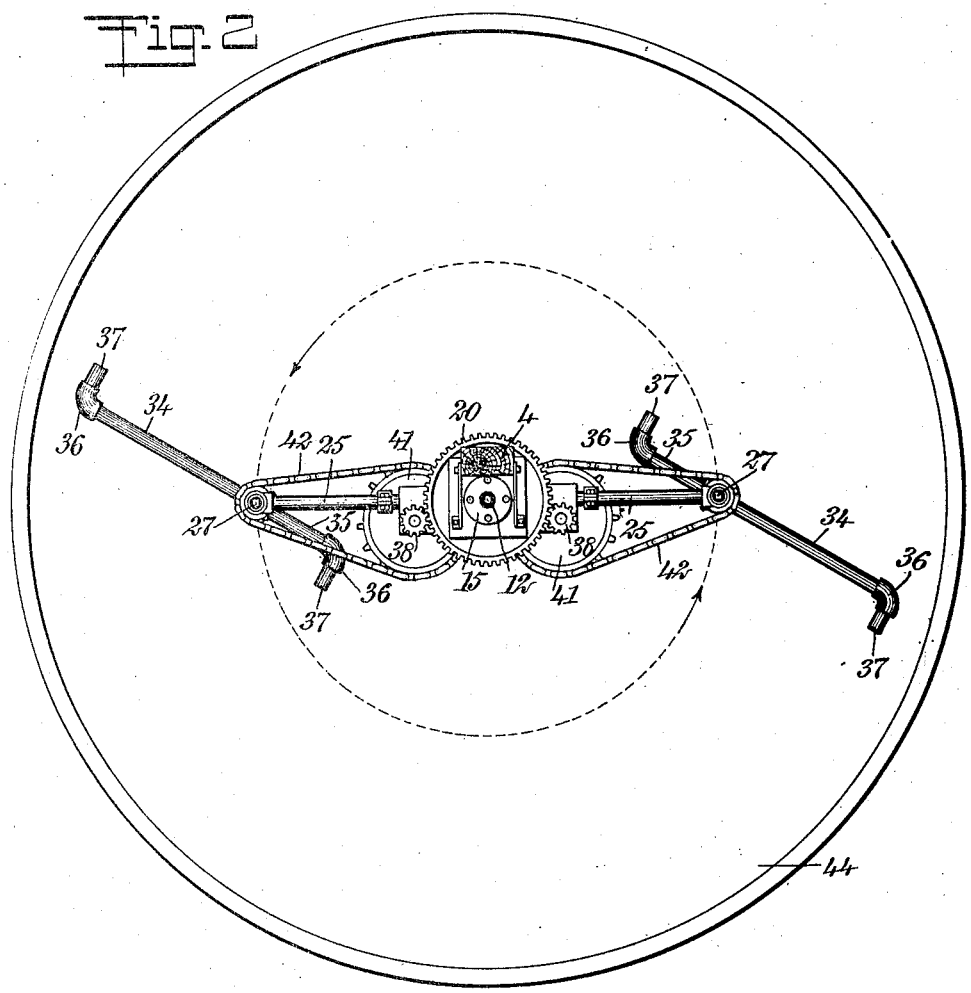
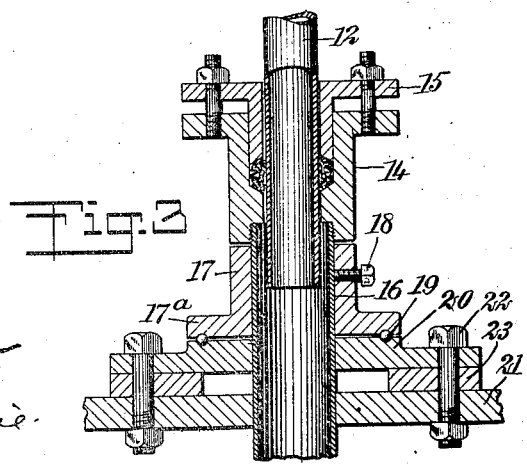
WITNESSES
INVENTOR
Benito Solis
BY Munn & Co
ATTORNEYS

UNITED STATES PATENT OFFICE.

BENITO SOLIS, OF GAUDALUPE DE LOS REYES, MEXICO.

AGITATOR.

No. 850,069. Specification of Letters Patent. Patented April 9, 1907.

Application filed October 30, 1906. Serial No. 341,354.

*To all whom it may concern:*

Be it known that I, BENITO SOLIS, a citizen of the Republic of Mexico, and a resident of Guadalupe de los Reyes, Sinaloa, Mexico, have invented a new and Improved Agitator, of which the following is a full, clear, and exact description.

My invention has for its object to provide means for thoroughly stirring, agitating, and oxygenating the liquid contents of a receptacle and is adapted to be used with processes of various kinds and under different conditions, but especially for extracting minerals by the cyanid process and adapted to be used for agitating and stirring with air under pressure auro-argentiferous minerals which have been reduced to a fine powder and placed in a tank containing sodium or potassium cyanid solution, so as to dissolve their values, renovate the contact-surfaces, and oxygenate the solution in order to increase its solving power. This I accomplish by the means illustrated in the accompanying drawings, in which drawings like characters of reference indicate like parts throughout the views, and in which—

Figure 1 is a side elevation of a device embodying my invention. Fig. 2 is a plan view of the same, partly in section, on the line 2 2 of Fig. 1. Fig. 3 is a vertical section, enlarged, of a swivel tubular connection shown in Fig. 1. Fig. 4 is a vertical section of a swivel end connection, also shown in Fig. 1; and Fig. 5 is a side elevation, partly in section, of a discharge-head.

As illustrated in the drawings, my device is mounted upon a supporting-frame comprising parallel vertical guide-bars 1, secured at their lower ends to transverse beams 2, having brace-beams 3 connected therewith and with the guide-bars 1. A sliding beam 4 is arranged between the guide-bars 1 and is preferably provided with a rack 5, secured to the back of the beam 4 and adapted to engage a pinion 6, which is mounted upon a shaft 7, journaled in any suitable manner upon the bars 1 and provided with a hand-wheel 8, adapted to operate said pinion and raise and lower the sliding beam 4. A supply-pipe 9 is provided with a flexible connection 10 and an intermediate valve 11, communicating with a pipe 12, fixedly secured to the beam 4 by means of a strap 13 or otherwise. A stuffing-box 14 is connected with the fixed pipe 12, provided with a packing-gland 15, the end of said pipe projecting beyond the lower end of the stuffing-box 14, so as to extend into a pipe 16, having a threaded connection with the stuffing-box 14, as shown in Fig. 3, so as to enable the stuffing-box 14 and the pipe 16 to rotate around the fixed pipe 12 while establishing tubular communication between the pipes 12 and 16. A flanged collar 17 is fixedly secured to the pipe 16, preferably by means of a set-screw 18, so as to rotate with the pipe 16 and stuffing-box 14, connected therewith. A ball-bearing 19 is arranged between the flange 17$^a$ of the collar 17 and a bearing-plate 20, which is fixedly attached to a stationary gear 21 by means of bolts 22, connecting said parts with a bracket 23, adapted to be secured in any suitable manner to the sliding beam 4. The pipe 16 extends through the gear 21 and is provided with a T-coupling 24, which has a threaded engagement with branching pipes 25, connected at their outer ends to swivel-couplings, each preferably consisting of a head 26, having a threaded engagement with the pipes 25 and provided on its upper end with a plug 27 and on its lower end with a stuffing-box 28, having a threaded engagement with the head 26, and a packing-flange 29, connected to said stuffing-box. Pipes 30 are rotatably mounted in the stuffing-boxes 28 and are provided on their upper ends with a head 31 and a ball-bearing 32, arranged between said head and the stuffing-boxes 28. The lower end of the pipes 30 is connected, by means of a coupling 33, with tubular heads 34 and 35, each provided with a discharge-head 36, as shown in Figs. 1 and 5. The discharge-heads 36 are provided with a nozzle 37, adapted to discharge a jet of air which is passed through the inlet-pipe 9 into the flexible connection 10 and through the fixed pipe 12 and rotating pipe 16, the branching pipes 25 and 30, the tubular heads 34 and 35, the discharge-heads 36, and the nozzles 37, connected therewith. By means of such construction the pipe 16 and the branching pipes 25 and mechanism connected therewith are rotatably mounted upon the bearing-plate 20, which is fixedly attached to the stationary gear 21. The teeth of the fixed gear 21 engage pinions 38, which are secured to shafts 39, mounted upon the branching pipes 25 and journaled in bearing-boxes 40, secured to said pipes. The lower ends of said shafts 39 are provided with sprocket-wheels 41, which are connected, by means of an endless chain 42, with sprocket-wheels 43, secured to the pipes 30. The tubular heads 34 and 35 and discharge-nozzles 37, together with the lower ends of the pipes 30, are arranged within a vat or receptacle 44, of any suitable description, in which are placed auro-argentiferous minerals reduced to a fine powder and a suitable quantity of sodium or potassium cyanid solution. Compressed air is then forced through the supply-pipe 9 and out of the discharge-nozzles 37 into the body of said mixture. As the jets of air strike the solution they rotate the tubular heads 34 and 35 and the pipes 30, connected therewith, in the rotary joints 26, secured to the ends of the branching pipes 25. The sprocket-wheels 43, secured to the pipes 30, are rotated therewith and by means of the endless chains 42 rotate the sprocket-wheels 41, the shafts 39, upon which they are mounted, and the pinions 38, mounted upon said shafts, thereby causing said pinions to rotate around the toothed periphery of the stationary gear 21 and cause the branching pipes 25 and the vertical pipe 16, connected therewith, to rotate on the sliding beam 4 of the main frame.

By means of such construction and operation the discharge heads and nozzles are carried bodily through the mixture in a circular path, and while so doing the pipes 30 and the discharge-heads connected therewith rotate on their own axis in the rotary connections 26, secured to the pipes 25, thereby thoroughly and evenly distributing the compressed air throughout the solution, effectually stirring, agitating, and oxygenating said solution, increasing its solving power to the greatest extent, and enabling said solution to thoroughly dissolve the values of the minerals contained therein.

The construction herein shown and described embodies my invention in its preferred form. I do not desire to be limited to such construction, however, as other means having similar capabilities may be used without departing from my invention.

Having thus described my invention, what I claim as new, and desire to secure by Letters Patent, is—

1. The combination with a supply-pipe, of a tubular support rotatably connected with said supply-pipe by means of a rotary joint, and a discharge-head mounted upon said tubular support and connected therewith by means of a rotary joint.

2. The combination with a main frame, of a supply-pipe, a rotatable head comprising a vertical pipe having branching arms provided with discharge-orifices extending in opposite directions, a rotatable tubular support mounted on said main frame, a pinion mounted upon said support, a gear mounted upon the main frame, pulleys connected with said pinion and with the rotatable head, and belt connections extending between said pulleys, substantially as shown and described.

3. The combination with a supporting-frame, of a supply-pipe, oppositely-disposed rotatable heads having discharge-orifices, a tubular connection between said heads and supply-pipe, a central rotating head connected with said supply-pipe, and means for rotating the central head on its axis, and the outer heads bodily in circular lines, substantially as shown and described.

4. The combination with a supporting-frame, of a supply-pipe, oppositely-disposed rotatable heads having discharge-orifices, a tubular connection between said heads and supply-pipe, and means for rotating said heads simultaneously on their axis and bodily in circular lines, substantially as shown and described.

5. The combination with a supporting-frame, of a supply-pipe, rotatable heads having discharge-orifices, a tubular connection between said heads and supply-pipe, and means for rotating said heads simultaneously on their axes and bodily in circular lines, substanitally as shown and described.

6. The combination with a supporting-frame, of a supply-pipe, a tubular support connected with said supply-pipe by means of a rotary joint, and provided with a stuffing-box rotatable on said pipe, heads rotatably mounted on said support by means of swivel-joints, a fixed gear, pinions mounted on said tubular support engaging said gear, and mechanism connecting said pinions and heads.

7. The combination of a tubular support adapted to rotate on an axis, and a head provided with discharge-orifices mounted to rotate on the free end of the said support, and connecting mechanism adapted to enable the rotation of said head on its axis to rotate said support on its axis, substantially as shown and described.

In testimony whereof I have signed my name to this specification in the presence of two subscribing witnesses.

BENITO SOLIS.

Witnesses:
I. H. RICO,
FELIX ELORRIAGA.